United States Patent [19]
Takayanagi et al.

[11] Patent Number: 5,667,921
[45] Date of Patent: Sep. 16, 1997

[54] BLACK MATRIX AND PROCESS FOR FORMING THE SAME

[75] Inventors: Takashi Takayanagi; Akihiko Takeda; Fumiaki Shinozaki, all of Shizuoka, Japan

[73] Assignee: Fuji Photo Film Co., Ltd., Kanagawa, Japan

[21] Appl. No.: 626,927

[22] Filed: Apr. 3, 1996

[30] Foreign Application Priority Data

Apr. 4, 1995 [JP] Japan ............................ 7-078684

[51] Int. Cl.$^6$ ............................................. G02F 1/1335
[52] U.S. Cl. ........................................... 430/7; 430/321
[58] Field of Search ..................... 430/7, 6, 321, 430/413

[56] References Cited

FOREIGN PATENT DOCUMENTS

| | | |
|---|---|---|
| 4-32802 | 2/1992 | Japan . |
| 6-75110 | 3/1994 | Japan . |
| 6-109909 | 4/1994 | Japan . |
| 6-222353 | 8/1994 | Japan . |

*Primary Examiner*—John A. McPherson
*Attorney, Agent, or Firm*—Sughrue, Mion, Zinn, Macpeak & Seas

[57] ABSTRACT

A black matrix for a color filter and method for forming the same which is safe inexpensive and provides good shielding performance and a low reflectance, and which is suitable for a paneling process. The black matrix is formed on a transparent substrate, and comprises a pattern of a resin composition containing a black pigment, physical development nuclei and a metal deposited on the physical development nuclei by physical development. The patterned resin composition is prepared from a photosensitive aqueous resin composition containing at least one black pigment.

17 Claims, No Drawings

BLACK MATRIX AND PROCESS FOR FORMING THE SAME

FIELD OF THE INVENTION

This invention relates to a black matrix which constitutes a color filter for use in the color display of a liquid display, etc., and a method for forming the same.

BACKGROUND OF THE INVENTION

To achieve excellent image quality and highly defined contrast in a liquid color display, a black matrix having high-shielding performance must be formed among pixels of three colors in a color filter. In a liquid color display having an active matrix drive system and employing a thin film transistor, good shielding performance is required. Good shielding, in particular, prevents the deterioration in image quality which accompanies current leakage due to the light emitted by the thin film transistor.

Black matrices have generally been prepared by depositing a chrome film on a substrate, for example, by sputtering, and patterning the chrome film by photolithography. Although this method using chrome can provide a black matrix having high accuracy and good shielding performance due to the thin film, it is disadvantageous in some respects. Namely, the vacuum film-forming process (e.g., chrome sputtering) that is required in this method increases the cost. Moreover, the waste liquid from the process of chrome etching presents a safety problem.

On the other hand, there is another method for forming a black matrix without using chrome. This method comprises dispersing a black pigment (e.g., carbon black) and a dye in a resist followed by photographic patterning. Although this method can improve safety and reduce cost as compared with using chrome, the resist containing a black dye or pigment fails to achieve sufficient resolution. In the case of thick black matrix pixels (about 1 µm thick), other pixels formed by the resist method, etc. would partly overlap the black matrix pixels, thus causing unevenness in thickness. As a result, the liquid panel (i.e., the final product) suffers from cell gap irregularities which create problems in the display (color shading, etc.). Therefore, the film thickness of the black matrix pixel is desirably about 0.7 µm or less. However, it is difficult to establish sufficient shielding performance in this thickness range employing this method.

A method using electroless deposition as disclosed in JP-A-6-75110, etc. (the term "JP-A" as used herein means an "unexamined published Japanese patent application") can provide a black matrix having a satisfactory shielding performance even at a thickness of 0.7 µm or less. This is because a metal is deposited in the electroless deposition. However, another disadvantage arises in that the thin film has a high reflectance. This makes the panel face dazzling to thereby deteriorate contrast.

In the method described in JP-A-4-32802 using reduction of a silver salt, a silver halide emulsion is applied onto a substrate. After exposure via a mask, the black matrix part thus irradiated is developed and fixed to thereby reduce and deposit the silver. Although this method is relatively inexpensive, the emulsion layer remains not only in the black matrix but also in other parts of the color filter. This frequently causes coloration in the heating process for paneling, or wrinkling or cracking after the formation of a transparent electrode.

SUMMARY OF THE INVENTION

An object of the present invention is to provide a black matrix for a color filter and a method for forming the same which is safe, inexpensive, and provides good shielding performance and low reflectance, and which is suitable for a paneling process.

According to the present invention, the above object of forming a black matrix having a thin film, good shielding performance and low reflectance at low cost has been achieved by providing a black matrix formed on a transparent substrate which comprises a pattern comprising a cured resin composition containing at least one black pigment, physical development nuclei and a metal deposited on the physical development nuclei by physical development. The cured resin composition pattern is prepared from a photosensitive aqueous resin composition containing at lease one black pigment. The term "black pigment" as used herein includes black dyes and systems in which dyes are mixed to thereby provide a substantially black color.

The present invention is described in greater detail below.

DETAILED DESCRIPTION OF THE INVENTION

In the present invention, the black matrix is formed on a color filter substrate for use in a color liquid crystal display. More particularly, openings among red, green and blue pixels on the transparent substrate are filled with black matrix pixels to thereby prevent light leakage among these pixels and to provide a display having high contrast.

In the present invention, the black matrix can be formed by various methods as described below.

In a first method, physical development nuclei and a black pigment are preliminarily added to a solution of a photosensitive aqueous resin composition, and then a resin composition layer containing the black pigment and physical development nuclei is formed on a transparent substrate. After forming a latent image by pattern exposure, a donor sheet containing a metal compound is adhered to the resin composition layer via a developer for physical development, and the metal is deposited by a diffusion transfer process. Alternatively, the metal is deposited by dipping in an electroless deposition solution containing a metal compound and a reducing agent, or by applying an electroless deposition solution to the resin composition layer. The black matrix is then formed by development processing. It is also possible to first expose and develop the photosensitive aqueous resin composition layer and to then deposit the metal. This first method is referred to herein as method A.

In a second method, a photosensitive aqueous resin composition layer containing a black pigment is formed on a transparent substrate. Then, the resin composition layer is contacted with an aqueous solution containing physical development nuclei to adsorb the physical development nuclei. Subsequently, the same procedures as described in method A above are carried out. This second method is referred to herein as method B.

In each method, the resin composition layer may be formed by directly applying a solution containing a resin, etc. on a transparent substrate followed by drying. Alternatively, the resin composition layer may be formed by transferring a resin composition layer, which has been applied and formed on a temporary (intermediate) support, onto a transparent substrate.

The transparent substrate for use in the present invention can be made of glass (soda lime glass, borosilicate glass, etc.) or plastics.

The photosensitive aqueous resin composition for use in the present invention may comprise, as main component(s), (i) a compound having a unsaturated group(s), aqueous resin and a photopolymerization initiator, (ii) an aqueous resin having a photosensitive group introduced therein, or (iii) an aqueous resin and an aqueous resin having a photosensitive group introduced therein. The photosensitive aqueous resin composition further contains a black pigment and, optionally, physical development nuclei.

The photosensitive aqueous resin composition is described in detail below.

A negative type photosensitive aqueous resin composition can be used as the photosensitive aqueous resin composition for use in this invention. Sensitivity can be imparted in a negative working system by mixing a compound having an unsaturated group(s) (e.g., acryl group, methacryl group) and a photopolymerization initiator with an aqueous resin. In this case, the exposed part is hardened. After development, the exposed part remains on the transparent substrate to thereby provide the desired pattern. Examples of the compound having an unsaturated group(s) include monofunctional monomers (such as methoxydiethylene glycol methacrylate, methoxypolyethylene glycol #230 methacrylate, methoxypolyethylene glycol #400 acrylate, 2-hydroxyethyl acrylate, 2-hydroxypropyl acrylate, 2-hydroxyethyl methacrylate, etc.), bifunctional monomers (such as triethylene glycol diacrylate, polyethylene glycol #200 diacrylate, polyethylene glycol #400 diacrylate, etc.), trifunctional monomers (such as trimethylolpropane triacrylate, etc.), tetrafunctional monomers (such as pentaerythritol triacrylate, etc.) and hexafunctional monomers (dipentaerythritol hexaacrylate, etc.).

It is also possible to use a water-soluble oligomer having a water-soluble functional group(s) as the compound having an unsaturated group(s) in its molecule. Examples thereof are as follows: polyurethane acrylate oligomers such as the product obtained by reacting a diol, the reaction product of a diol having a carboxy group and isocyanate, and a (meth) acrylate having a hydroxyl group as described in JP-A-4-211413; polyurethane acrylate oligomers such as the product obtained by reacting a diol, the reaction product of a polyester diol of a dicarboxylic acid having a sulfonic acid group and isocyanate, and a (meth)acrylate having a hydroxyl group as described in JP-A-3-168209; epoxy acrylate oligomers such as the reaction product of an epoxy (meth)acrylate with a polybasic acid anhydride as described in JP-A-5-140251; and the reaction product of a copolymer of maleic anhydride, a copolymer having an unsaturated group and a (meth)acrylate having a hydroxy group.

Any of these compounds or a mixture thereof may be used.

Moreover, the water-soluble resins shown below or a mixture thereof can be used as the aqueous resin for use in the above described embodiments (i) and (iii) of the photosensitive aqueous resin composition: polyvinyl alcohol, polyethylene glycol, polypropylene glycol, polyacrylamide, polyacrylic acid amide, polyvinyl pyrrolidone, water-soluble alkyds, polyvinyl ethers, polymaleic acid copolymers, polyethylene-imine, animal proteins such as gelatin and casein, vegetable viscous materials such as gum arabic, starches such as dextrin, celluloses such as methyl cellulose and hydroxyethyl cellulose.

The photopolymerization initiator for use in the present invention includes compounds which are generally employed for initiating the photopolymerization of acrylate or methacrylate monomers. Examples thereof include benzophenone, benzyl, benzoin, benzoin ethyl ether, benzoyl peroxide and azobisisobutyronitrile compounds. More particularly, Darocur 2959 (manufactured by Merck & Co. Inc.), Kayacur ABQ, BTC and QTX (manufactured by Nippon Kayaku Co., Ltd.), for example, may be used as the photopolymerization inhibitor.

It is also possible to prepare a photosensitive aqueous resin composition by mixing a diazo compound or an azide compound with an aqueous resin instead of using the above-described unsaturated compound and photopolymerization initiator.

Another method for imparting sensitivity comprises directly binding a photosensitive group to an aqueous resin (embodiment (ii) described above). Examples of the photosensitive group include polyvinyl alcohol denatured with a stilbazole group, and polyvinyl alcohol denatured with cinnamic acid by condensation with the cinnamic acid. Optionally, an aqueous resin as exemplified above may be added to the aqueous resin having a photosensitive group introduced therein (embodiment (iii) described above).

Examples of the former photosensitive aqueous resin include SPP-H13, SPP-M20 and SPP-S-10 (manufactured by Toyo Gosei Kogyo K.K.), etc.

A single type of photosensitive aqueous resin may be employed alone. Alternatively, the photosensitive aqueous resin may be blended with other aqueous resin(s) to thereby control the viscosity and the suitability for exposure development. Examples of these viscosity controlling aqueous resins include polyvinyl pyrrolidone, polyvinyl alcohol and gelatin, however, the present invention is not limited thereto.

In method A, the photosensitive aqueous resin composition contains a black pigment and physical development nuclei. Next, the preparation thereof is described below.

When palladium is employed as the physical development nuclei, a palladium compound (e.g., palladium chloride) dissolved in water is reduced with a reducing agent (e.g., sodium boron hydride) in the presence of a protective colloid (e.g., polyvinyl pyrrolidone). Then, the above-described photosensitive aqueous resin composition is added thereto to provide a solution of the photosensitive aqueous resin composition containing the physical development nuclei. In general, the metal compound, which is reduced to provide the physical development nuclei (i.e., the palladium chloride in this case), may be used in a weight ratio to the above described main component(s) of the photosensitive aqueous resin composition of from 0.0001 to 0.4, preferably from 0.001 to 0.2. When this weight ratio is smaller than 0.0001, the physical development is insufficient such that the desired black matrix density cannot be achieved. Generally, an optical density of from about 2 to 2.8 provides a shielding level which does not seriously deteriorate the display qualities in systems (such as the STN system, etc) commonly employed in passive liquid crystal displays.

On the other hand, in the TFT system, etc. employed in active liquid crystal displays, the optical density is desirably at least 3 because greater contrast is required. In the present invention, an optical density exceeding 2 can be established by setting the weight ratio of the palladium chloride to the main component(s) of the photosensitive aqueous resin composition to at least 0.001.

On the contrary, when the above-described weight ratio exceeds 0.4, the nuclei tend to aggregate at the step of forming the physical development nuclei. As a result, the aqueous solution of the resin composition becomes unstable and is no longer suitable for production.

Useful physical development nuclei can also be made of other metals such as gold, platinum, silver, palladium/tin alloy, copper, iron, rhodium and aluminum. It is also possible to use, as physical development nuclei, metal sulfides containing a metal such as silver, zinc, chrome, gallium, iron, cadmium, cobalt, nickel, manganese, lead, antimony, bismuth, arsenic, copper, rhodium, palladium, platinum, lanthanum and titanium, selenium compounds, tellurium compounds, polysulfides, polyselenides, etc. Of these, metals such as palladium, copper, silver and palladium/tin alloy are preferred from the viewpoints of safety and cost.

In addition to polyvinyl pyrrolidone, the protective colloid can also comprise gelatin, polyvinyl alcohol or surfactants. Examples of the gelatin include gelatin derivatives such as acylated gelatins (e.g., phthalated gelatin, maleated gelatin, etc.) and grafted gelatins prepared by grafting acrylic acid, methacrylic acid, amide, etc. to gelatin. The polyvinyl alcohol for use in the present invention includes commercially available polyvinyl alcohols having a degree of saponification of 70% or higher. Examples thereof include highly saponified polyvinyl alcohols having a degree of saponification of about 90% (e.g., PVA110 manufactured by Kuraray Co., Ltd.), those having a degree of saponification of about 88% (e.g., PVA217) and those having a low degree of saponification of about 80% or below. Moreover, carboxylic acid-denatured polyvinyl alcohol (e.g., KL318 and KL118 manufactured by Kuraray Co., Ltd.), silica-denatured polyvinyl alcohol (e.g., R1130), cation-denatured polyvinyl alcohol (e.g., C318), terminal alkyl group-denatured polyvinyl alcohol (e.g., MP103) and terminal thiol-denatured polyvinyl alcohol (e.g., M115) can also be used.

The protective colloid may be used at a weight ratio to the metal compound before reduction (such as palladium chloride, etc.) of from 0.001 to 10,000. When this weight ratio is smaller than 0.001, the metal formed by the reduction reaction tends to aggregate. On the other hand, when the weight ratio exceeds 10,000, the concentration of the deposited metal in the protective colloid is lowered. In turn, only poor black matrix density can be achieved after physical development processing. The weight ratio preferably ranges from 0.01 to 2,000.

The surfactant for use in the present invention polyoxyethylene octylphenyl ether, sodium dodecyl benzenesulfonate, etc.

In addition to boron hydride compounds (such as sodium boron hydride, etc.) as the reducing agent, sodium hypophosphite, diamine borane, hydroquinone, hydroquinone derivatives (e.g., 2-chlorohydroquinone, etc.), naphthalene derivatives (e.g., 1,4-dihydroxynaphthalene, etc.), aminophenol derivatives (e.g., p-oxyethylaminophenol, etc.), heterocyclic compounds (e.g., o-dihydroxyquinoline, 6-hydroxy-2,4,5-triaminopyrimidine, 3-amino-4-oxo-2-iminotetrahydrothiophene, etc.), thiazole derivatives (e.g., acyalminohydroxythiazole, etc.), pyrazolidone derivatives (e.g., 1-phenyl-3-pyrazolidone, etc.) and pyrazolone derivatives (e.g., 4-amino-5-pyrazolone-3-carboxyl, etc.) can also be used.

The addition molar amount of the reducing agent is generally from 0.1 to 5 times that of the material to be reduced.

The black pigment for use in the present invention can comprise carbon black, metal oxides (such as black iron oxide, black nickel oxide, etc.) and dyes. The carbon black includes commercially available carbon blacks (e.g., dispersion product PSM 962 manufactured by Mikuni Shikiso K.K., etc.). Alternatively, a carbon black powder dispersed in purified water, etc. may be used.

In the case of dyes, a mixture of several dyes, the hue of which is close to a black hue, can be employed. Such dyes include those described in "Ganryo oyobi Enogu (Pigments and Paints)" (Toshihide Kuwahara and Tokuo Ando, Kyoritsu-Zensho, Kyoritsu Shuppan), "Saishin Ganryo Binran (The Latest Pigment Handbook)" (Ed. by Nippon Ganryo Gijutsu Kyokai, Seibundo Shinkosha), etc., and may be appropriately employed herein.

It is also possible to use a combination of two or more black pigments selected from among the above-described pigments.

The black pigment is preferably added in a weight ratio to the above described main component(s) of the photosensitive aqueous resin composition of from 0.01 to 1. When this weight ratio is smaller than 0.01, the desired effect is not achieved by the addition, and the reflectance is still maintained at a high level. On the other hand, when the weight ratio exceeds 1, the film of the photosensitive aqueous resin composition layer is weakened and frequently exhibits poor adhesion to the transparent substrate.

Furthermore, a matting agent may be added to the photosensitive aqueous resin composition. The reflectance can be further decreased by adding a matting agent in addition to the black pigment. However, the optical density is decreased with an increase in the amount of the matting agent because the matting agent is usually colorless. Accordingly, the weight ratio of the matting agent to the above described main component(s) of the photosensitive aqueous resin composition preferably ranges from 0.01 to 1.0.

Useful inorganic matting agents include colloidal silica, zinc oxide, etc. Examples of the colloidal silica include commercially available ones (e.g., aqueous dispersion products Snowtex 0, 20, S, 20L and OL, manufactured by Nissan Chemical Industries, Ltd.), etc. Examples of zinc oxide include fine particles of zinc white (manufactured by Honjo Chemical, K.K.), while examples of titanium oxide include Tipaque R680 (manufactured by Ishihara Sangyo Kaisha, Ltd.), etc.

Useful organic matting agents include fine particles comprising polymers (e.g., polystyrene, polymethyl methacrylate, polybutyl acrylate, etc.) as the main component. Examples thereof include Microgel E1001 and E1002 (manufactured by Nippon Paint Co., Ltd.), MP1451 (manufactured by Soken Chemical & Engineering Co., Ltd.), etc. dispersed in water. Also, aqueous dispersion products can be used such as Chemiperl S100 (manufactured by Mitsui Petrochemical Industries, Ltd.), etc. as polyolefin-based fine particles.

The size of the matting agent preferably ranges from 0.005 to 0.3 μm. A matting agent having a particle size which is smaller than 0.005 μm fails to lower the reflectance. When the size of the matting agent exceeds 0.3 μm, the film quality of the photosensitive aqueous resin composition layer is weakened and the layer of the resin composition frequently exhibits poor adhesion to the transparent substrate. The above-mentioned matting agents may be employed alone. It is also possible to use a mixture of two or more of the matting agent different in the kind or diameter thereof. The matting agent may be used in the form of a commercially available aqueous dispersion product. Alternatively, a powdery product may be dispersed in water before use.

It is also possible to add surfactants or alcohols (e.g., methanol, etc.) to the aqueous solution of the photosensitive aqueous resin composition to thereby ensure uniform application that is free from repellency.

Subsequently, the photosensitive aqueous resin composition layer thus formed, which contains the black pigment and the physical development nuclei, is exposed with an exposure machine provided with a mercury vapor lamp, etc. so as to leave a pattern corresponding to the black matrix. That is, a latent image is formed on the exposed resin composition layer. Then, a donor sheet containing a metal compound (metal salt, etc.) is adhered to the resin composition layer via a developer for physical development, and the metal is deposited onto the resin composition layer having the above-described latent image. After deposition of the metal, the material is washed with water and dried.

The donor sheet for use in the present invention may be prepared by applying a silver salt emulsion, which contains, for example, a silver halide (e.g., silver chloride, silver bromide, silver iodide) for deposition of silver, on a base made of polyethylene terephthalate, etc. Examples of the donor sheet include a photographic negative film QNF-100 of the Fuji Q-ART system (manufactured by Fuji Photo Film Co, Ltd.) etc. When copper is to be deposited, a donor sheet containing a copper salt such as copper sulfate can be used. When nickel is to be deposited, a donor sheet containing a nickel salt such as nickel chloride or nickel sulfate can be used.

The developer for physical development contains a reducing agent capable of reducing the metal compound described above. Examples of the reducing agent include formalin, sodium hypophosphite, hypophosphorous acid, N-dimethylamine borane, hydrazine, sodium boron hydride, etc.

The developer for physical development can further contain, for example, pH regulating agents, pH buffer solutions, stabilizers and complexing agents for stabilizing metal ions, etc., as needed.

The developer for the photosensitive aqueous resin composition layer can be made of a weakly alkaline developer comprising water, sodium carbonate, etc. as main components, a weakly alkaline developer comprising triethanolamine as the main component, or a strong alkali such as potassium hydroxide. It is also possible to employ a combination of these developers. Moreover, solvents (benzyl alcohol, etc.) may be added thereto or the pH value may be varied so as to improve the developing performance.

The development temperature preferably ranges from 20° to 50° C. At excessively low temperatures, a well defined pattern cannot be obtained due to under-development causing development residue. On the other hand, when the temperature is excessively high, a well defined pattern cannot be obtained due to side etching. Various treatments such as brush cleaning, spray developing or paddle development may be carried out in the development step.

The black matrix thus formed may be then heated to 120° to 260° C. The heating may be completed within about 10 to 140 minutes.

Aside from the metal deposition method as discussed above, it is also possible to employ an electroless deposition method. Various metals such as copper, nickel, cobalt, silver, palladium, platinum, alloys such as nickel/phosphorus alloy, etc. can be electrolessly deposited. Deposition solutions that can be used for electroless deposition are described in detail, for example, in "Saishin Mudenkai Mekki Gijutsu (The Latest Electroless Deposition Technology)", pp. 43–45 (Sogo Gijutsu Senta K.K.) or "Mudenkai Mekki (Electroless Deposition)" (Tokuzo Kanbe, NP-Series, Maki Shoten). Many of these deposition solutions are commercially available. For example, Emplate CU406 and 704 (manufactured by Meltex Inc.) can be used for copper deposition and Melplate NI-865, etc. for nickel deposition.

More particularly, the exposed aqueous resin composition layer having thereon the latent image formed by exposure is contacted with the above-described electroless deposition solution to thereby deposit the metal. Subsequently, the development processing is performed in the same manner to thereby form a black matrix.

The process for forming the black matrix as described above may be substituted by another method which comprises exposing the photosensitive aqueous resin composition layer, developing the same and then depositing the metal.

Next, method B is described below.

A photosensitive aqueous resin composition layer containing a black pigment (but no physical development nuclei) is formed on a transparent substrate. Then, the resin composition layer is contacted with an aqueous solution of physical development nuclei. As a result, the physical development nuclei are adsorbed by the resin composition layer containing the black pigment as described above. After forming a latent image by pattern exposure, a donor sheet containing a metal compound is adhered to the exposed resin composition layer via a developer for physical development to deposit the metal. Then, unnecessary metal-deposited parts are removed by developing to thereby provide a black matrix.

The aqueous solution of the photosensitive aqueous resin composition containing the black pigment include those described above with respect to method A but containing no physical development nuclei. It is also possible to add surfactants or alcohols (e.g., methanol, etc.) to the aqueous solution of the resin composition to thereby ensure uniform application free from repellency.

Then, an aqueous solution containing physical development nuclei is contacted with the photosensitive aqueous resin composition layer by dip coating, spin coating, spray coating, roll coating, etc. As a result, the physical development nuclei are adsorbed by the resin composition layer. The physical development nuclei can comprise metals (e.g., palladium, silver, copper, platinum, gold, etc.) or metal compounds (e.g., palladium chloride, nickel sulfate, etc.). The aqueous solution of the physical development nuclei is a colloidal aqueous solution or an aqueous solution of the above described metal or metal compound.

In the case of palladium, there have been marketed palladium colloidal aqueous solutions are commercially available which use tin ion as a protective colloid mainly for electroless deposition catalysts of copper, etc. These products may be used either as such or after diluting with purified water (e.g., Emplate Activator 444 manufactured by Meltex Inc.).

Prior to contacting with the aqueous solution of physical development nuclei, the resin composition layer may be pre-treated with an alkaline or acidic aqueous solution, so as to easily adsorb physical development nuclei. In the case of a palladium/tin protective colloid, it is desirable to eliminate tin ion by treating with an acidic aqueous solution (for example, Emplate PA491 manufactured by Meltex Inc.), etc.

After forming the photosensitive aqueous resin composition layer containing the black pigment on the transparent substrate, the physical development nuclei are adsorbed by the resin composition layer. Then, the resin composition layer is exposed with an exposure machine provided with a mercury vapor lamp, etc. to form a latent image. Subsequently, the resin composition layer having the latent image is subjected to metal-deposition, development processing, washing with water, drying, heating, etc. in the same manner as described in method A. In this manner, a black matrix is formed on the transparent substrate.

In method B, the latent image may be preliminarily formed by pattern exposure followed by treatment with the aqueous solution of physical development nuclei.

The present invention will be further described in more detail with reference to the following Examples, but the invention should not be construed as being limited thereto. The parts and percentages as used herein are by weight unless otherwise specified.

EXAMPLE 1

This Example exemplifies a process for forming a black matrix layer according to method A.

First, a solution of a photosensitive aqueous resin composition containing physical development nuclei was prepared in the following manner.
Preparation of Solution of Photosensitive Aqueous Resin Composition containing Physical Development Nuclei 0.01 g of palladium chloride and 0.2 g of 0.5N hydrochloric acid (a commercially available product) were stirred in 14.7 g of purified water while heating to about 40° C., to thereby dissolve the palladium chloride. To a protective colloidal aqueous solution prepared by dissolving 0.02 g of polyvinyl alcohol PVA 110 (manufactured by Kuraray Co., Ltd.) in 14.3 g of purified water, were added, at 25° C. over 30 minutes, the above-described aqueous palladium chloride solution and a reducing agent solution prepared by dissolving 0.014 g of ascorbic acid in 15.6 g of purified water. After stirring at room temperature for 1 hour, 12.5 g of a 9.01% solution of polyvinyl alcohol KL318 (manufactured by Nippon Synthetic Chemical Industry, Co., Ltd.) and 9.36 g of SPP-M20 (stilbazole-denatured PVA manufactured by Toyo Gosei Kogyo K.K.) were added thereto at room temperature with stirring. The pH value of the mixture was adjusted to 6 with a 1N aqueous solution of sodium hydroxide.

Into 46.55 g of the thus obtained aqueous solution containing physical development nuclei, an aqueous solution was dropwise added with stirring. The aqueous solution was prepared by mixing 2.39 g of Microgel E1001 (solid concentration: 28.9%, manufactured by Nippon Paint Co., Ltd.) employed as a matting agent, 0.618 g an aqueous dispersion (solid concentration: 37.2%) of Regal 400 (carbon black manufactured by Cabot Co.) and 28.5 g of purified water. Thus, an aqueous solution of a photosensitive aqueous resin composition containing the black pigment, the matting agent and palladium as the physical development nuclei was prepared. The carbon black dispersion was prepared by adding a dispersing agent (Joncryl 62, manufactured by Johnson Polymer) in a ratio, in terms of solid content, of 1/10 to Regal 400, and stirring in a Mini Motor Mill M50 (manufactured by Aiger Co.) for 30 minutes.

This solution of the photosensitive aqueous resin composition was applied onto a transparent substrate. The substrate was prepared by cutting 7059 Glass having a thickness of 1.1 mm (borosilicate glass manufactured by Corning Glass Works) into a 100 mm square piece followed by ultrasonic cleaning using a Semicoclean 23 (manufactured by Furuuchi Kagaku K.K.). A spin coater was used for the application to obtain a photosensitive aqueous resin composition layer having a thickness of about 0.49 µm.

Next, the resin composition layer was exposed in a dose of 10 mj/cm$^2$ with an exposure machine UV330 (manufactured by Oak, Inc.) via a mask having a line width of 20 µm (i.e., light permeates through the black matrix part at a line width of 20 µm). Then, the exposed resin composition layer was subjected to shower development using a 1% aqueous solution of triethanolamine at 35° C. for 90 seconds. Subsequently, the resin composition layer was washed with a developer, which had been prepared by diluting a developer Fuji Color Art CA-1 (manufactured by Fuji Photo Film Co., Ltd.) 10-fold with purified water, and dried. Next, the surface of the glass substrate having thereon the patterned resin composition layer was uniformly moistened with Activator QA-1 of the Q-ART System (manufactured by Fuji Photo Film Co., Ltd.), which was employed as a developer for physical development. Then, a photographic negative film QNF-100 of the Fuji Q-ART system, on which a silver salt emulsion was coated, was adhered to the patterned resin composition layer as a donor film. After 1 minute, the donor film was peeled off and the glass substrate was washed with purified water.

The thickness of the resulting coating layer forming the black matrix was 0.59 µm. Its optical density as measured with a Macbeth densitometer was 3.28.

The reflectance of the glass substrate on the side opposite the black matrix as measured with a spectrophotometer U3410 (manufactured by Hitachi, Ltd.) was 6.8% at 555 nm, which is considerably less than that of chrome (about 55%).

Furthermore, color filter pixels (about 1.9 µm in thickness) of three colors (B, G and R) were formed on the substrate having thereon the above-described black matrix using pigment suspensions for color filters manufactured by Fuji-Hunt Electronics Technology. A transparent electrode (ITO) was furthermore formed thereon by the sputtering with heating to 200° C. No problem in appearance (wrinkling, cracking, etc.) was observed upon the sputtering. Also, the coloration did not cause an unacceptable decrease in permeability, etc.

EXAMPLE 2

This Example illustrates method A where the metal deposition is performed by electroless deposition.

A patterned aqueous resin composition layer was formed on a transparent glass substrate 7059 (manufactured by Corning Glass Works) in the same manner as described in Example 1. This glass substrate was treated in an electroless deposition nickel bath (pH 6) having the composition shown below at 40° C. to provide a film thickness of 0.5 µm.

| Electroless Deposition Bath | |
|---|---|
| nickel sulfate | 20 g |
| sodium citrate | 12 g |
| sodium hypophosphite | 10 g |
| sodium acetate | 7 g |
| ammonium chloride | 2.5 g |
| purified water | 450 g |

After the treatment, the glass substrate was washed with water and dried. The optical density thus measured was 3.4. Also, the glass substrate on the side opposite the black matrix exhibited a low reflectance of about 6.9% at 550 nm.

Similar to Example 1, color filter pixels and a transparent electrode were formed thereon. The appearance of the resulting filter was good, and no problem due to coloration was observed.

EXAMPLE 3

This Example illustrates a process for forming a black matrix substrate according to method B.

First, a solution of a photosensitive aqueous resin composition was prepared by mixing 12.54 g of a 9.01% solution of polyvinyl alcohol Gohsefimer Z200 (manufactured by Nippon Synthetic Chemical Industry, Co., Ltd.), 9.36 g of stilbazole-denatured PVA (SPP-M20, manufactured by Toyo Gosei Kogyo K.K.), 2.39 g of Microgel E1001 (solid concentration: 28.9%, manufactured by Nippon Paint Co., Ltd.), 0.18 g of an aqueous dispersion (solid concentration: 37.2%) of Regal 400 (carbon black manufactured by Cabot Co.), which is prepared by dispersing in a dynomil for 30 minutes, 75 g of purified water and 0.1 g of methanol. The solution of the photosensitive aqueous resin composition thus obtained was applied onto a 7059 glass substrate, which had been washed and cut in the same manner as described in Example 1, by spin coating to provide a layer thickness of 0.39 μm. The layer of the resin composition was then dried at 100° C. for 10 minutes.

After dipping in a pre-dipping Emplate PC236 solution (manufactured by Meltex, Inc.) for 3 minutes and washing with water, the substrate was further dipped in a palladium catalyst imparting solution of Emplate Activator 444 (manufactured by Meltex, Inc.) for 6 minutes. After washing with water, it was dipped in an adhesion enhancing solution of Emplate PA491 (manufactured by Meltex, Inc.) for 10 minutes and washed with water. As a result, the resin composition layer turned light brown, indicating that palladium had been adsorbed by the resin. After drying this glass substrate, a black matrix was formed thereon in the same manner as in Example 1. After the deposition of metallic silver, the film thickness was 0.46 μm, and the optical density was 3.35. The reflectance of the glass substrate on the side opposite the black matrix was 7.9% at 550 nm.

Similar to Example 1, color filter pixels and a transparent electrode were formed thereon. The appearance of the resulting filter was good, and no problem due to coloration was observed.

EXAMPLE 4

This Example illustrates the results achieved by depositing a metal after exposure and then performing development in accordance with method A.

First, a photosensitive aqueous resin composition layer was formed in the same manner as in Example 2, except that after application, the layer was dried at 90° C. for 10 minutes. Next, the resin composition layer was exposed in a dose of 10 mj/cm$^2$ using an exposure machine UV330 (manufactured by Oak, Inc.) via a mask having a line width of 20 μm (i.e., light permeates through the black matrix part at a line width of 20 μm) to thereby form a latent image.

Next, the surface of the glass substrate having thereon the exposed resin composition layer was uniformly moistened with Activator QA-1 of the Q-ART System (manufactured by Fuji Photo Film Co., Ltd.), which was employed as a developer for physical development. A photographic negative film QNF-100 of the Fuji Q-ART system, on which a silver salt emulsion was coated, was adhered to the resin composition layer as a donor film. After 1 minute, the donor film was peeled off and the glass substrate was washed with purified water.

Subsequently, the glass substrate was subjected to shower development at 35° C. for 90 seconds using a 1% aqueous solution of triethanolamine. Then, it was washed with a developer, which had been prepared by diluting a developer Fuji Color Art CA-1 (manufactured by Fuji Photo Film Co., Ltd.) 10-fold with purified water, and dried to provide a black matrix. The film thickness of the black matrix was 0.43 μm, and the optical density was 3.21. The reflectance of the glass substrate on the side opposite the black matrix was 8.5% at 550 nm.

Similar to Example 1, color filter pixels and a transparent electrode were formed on the glass substrate. The appearance was good, and no problem due to coloration was observed.

COMPARATIVE EXAMPLE 1

To an aqueous solution containing palladium as physical development nuclei (pH 6, 46.5 g) were added with stirring 12.5 g of a 9.01% solution of polyvinyl alcohol KL318 (manufactured by Nippon Synthetic Chemical Industry, Co., Ltd.) and 9.36 g of SPP-M20 (stilbazole-denatured PVA manufactured by Toyo Gosei Kogyo K.K.). Furthermore, 31.6 g of purified water was added thereto with stirring to prepare a solution of a photosensitive aqueous resin composition.

Using this solution, the same procedures as in Example 1 were carried out to thereby form a black matrix. This black matrix had a film thickness of 0.38 μm and an optical density of 3.13. The reflectance of the glass substrate on the side opposite the black matrix was 13.4% at 550 nm, which is less than that of chrome but exceeds 10%. This indicated after the formation of a color filter, the contrast would thereby be deteriorated.

By using a simple process, the present invention provides black matrix pixels having excellent shielding performance and a suppressed reflectance even at a small film thickness. The present invention also enables highly contrast and resolution in the display of a color filter. The black matrix of the present invention is further advantageous in that it is substantially free from coloration in the paneling process and problems in appearance (wrinkling, cracking, etc.) accompanying the formation of a transparent electrode. This is because the black matrix part contains no photosensitive aqueous resin composition.

While the invention has been described in detail and with reference to specific examples thereof, it will be apparent to one skilled in the art that various changes and modifications can be made therein without departing from the spirit and scope thereof.

What is claimed is:

1. A black matrix formed on a transparent substrate which comprises a pattern comprising a cured photosensitive aqueous resin composition containing at least one black pigment, physical development nuclei and a metal deposited on said physical development nuclei by physical development.

2. The black matrix as claimed in claim 1, wherein said cured photosensitive aqueous resin composition is prepared from a photosensitive aqueous resin composition comprising, as main component(s), (i) a compound having a unsaturated group(s), aqueous resin and a photopolymerization initiator, (ii) an aqueous resin having a photosensitive group introduced therein, or (iii) an aqueous resin and an aqueous resin having a photosensitive group introduced therein.

3. The black matrix as claimed in claim 2, wherein said black pigment comprises carbon black.

4. The black matrix as claimed in claim 3, wherein said photosensitive aqueous resin composition contains said carbon black in a weight ration of from 0.01 to 1 to the main component(s) of said photosensitive aqueous resin composition.

5. The black matrix as claimed in claim 2, wherein said photosensitive aqueous resin composition contains said black pigment in a weight ratio of from 0.01 to 1 to the main component(s) of said photosensitive aqueous resin composition.

6. The black matrix as claimed in claim 2, comprising physical development nuclei in a weight ratio to the main component(s) of said photosensitive aqueous resin composition of from 0.0001 to 0.4.

7. The black matrix as claimed in claim 2, wherein said photosensitive aqueous resin composition further contains a matting agent in a weight ratio to the main components of said photosensitive aqueous resin composition of from 0.01 to 1.0.

8. The black matrix as claimed in claim 1, wherein the at least one black pigment comprises a plurality of dyes.

9. The black matrix as claimed in claim 1, wherein said physical development nuclei comprise palladium.

10. A method for forming a black matrix on a transparent substrate which comprises the steps of:

forming a photosensitive aqueous resin composition layer containing physical development nuclei and a black pigment on said transparent substrate;

patterning said photosensitive aqueous resin composition layer; and depositing a metal on said patterned resin composition layer by electroless deposition or by contacting the patterned resin composition layer with a donor sheet containing a metal compound via a developer for physical development.

11. The method as claimed in claim 10, wherein said patterning comprises exposing and developing the photosensitive aqueous resin layer.

12. The method as claimed in claim 10, wherein said developer for physical development comprises a reducing agent.

13. A method for forming a black matrix on a transparent substrate which comprises the steps of:

forming a photosensitive aqueous resin composition layer containing a black pigment on said transparent substrate;

contacting said photosensitive aqueous resin composition layer with an aqueous solution of physical development nuclei to allow the photosensitive aqueous resin composition to adsorb said physical development nuclei;

washing said resin composition layer containing the adsorbed physical development nuclei;

patterning said washed resin composition layer; and depositing a metal on said patterned resin composition layer by electroless deposition or by contacting the patterned resin composition layer with a donor sheet containing a metal compound via a developer for physical development.

14. The method as claimed in claim 11, wherein said patterning comprises exposing and developing said photosensitive aqueous resin layer.

15. The method as claimed in claim 11, wherein said developer for physical development comprises a reducing agent.

16. A method for forming a black matrix on a transparent substrate which comprises the steps of:

forming a photosensitive aqueous resin composition layer containing a black pigment and physical development nuclei on said transparent substrate;

exposing said resin composition layer;

depositing a metal on said exposed resin composition layer by electroless deposition or by contacting the exposed resin composition layer with a donor sheet containing a metal compound via a developer for physical development to form a metal deposited resin composition layer; and developing said metal deposited resin composition layer.

17. The method as claimed in claim 12, wherein said developer for physical development comprises a reducing agent.

* * * * *